UNITED STATES PATENT OFFICE.

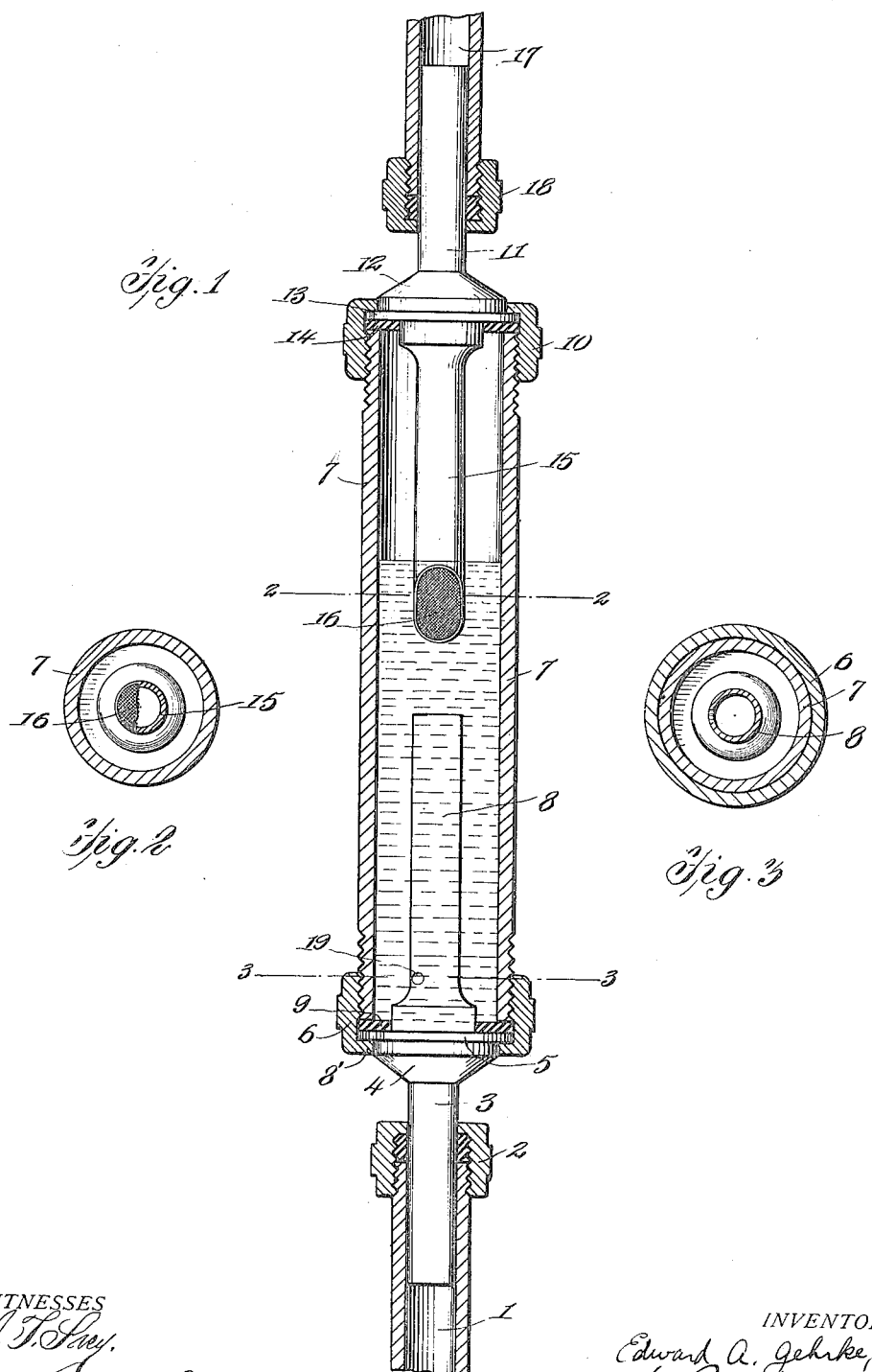

EDWARD A. GEHRKE, OF LINCOLN, NEBRASKA.

COMBINATION FILTER AND AIR-CHAMBER.

1,157,934.              Specification of Letters Patent.        Patented Oct. 26, 1915.

Application filed June 13, 1913.   Serial No. 773,548.

*To all whom it may concern:*

Be it known that I, EDWARD A. GEHRKE, a citizen of the United States, residing at Lincoln, in the county of Lancaster and State of Nebraska, have invented certain new and useful Improvements in Combination Filters and Air-Chambers, of which the following is a specification.

This invention relates to an improved air chamber and filter particularly adapted for use in connection with water pipes or the like.

The object of the invention contemplates the provision of an improved filtering device or attachment for carbonators, water supply pipes, etc., to collect and remove the solid impurities that may be in the water, thereby preventing subsequent discharge of the impurities with the water drawn for various purposes.

A further object of the invention resides in the provision of means including a specially arranged filtering attachment, whereby all solid foreign matter, such as sand, gravel, grit, etc., may be collected in a suitable receptacle or a basin provided therefor, thus preventing further passage of the said foreign matter into the faucet, carbonator or other device or appliance through which the water is drawn or passes.

A still further object of the invention resides in the provision of an air chamber formed within the filtering attachment whereby the strain attending the sudden cutting off of the water supply is received and absorbed within the said attachment, as the chamber is formed directly over and in communication with the catch basin comprising a part of the invention.

It is a well known fact that faucets, flushing devices, carbonators and other appliances often leak on account of sand or other foreign matter being distrained within the valve employed in connection therewith and it is to overcome this objectionable feature that the filtering device comprising my invention is designed.

The above and additional objects are accomplished by such means as are illustrated in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a vertical sectional view of a filtering device constructed in accordance with my invention, parts being shown in elevation; Fig. 2 is a section on the line 2—2 of Fig. 1; and, Fig. 3 is a section on the line 3—3 of Fig. 1.

Before proceeding with the detail description of the drawings, I desire to call particular attention to the fact that while I have evolved my invention with particular reference to the filtration of water, the same may be readily utilized for the filtration of various other liquids susceptible of its application.

Referring now to the drawings, wherein is illustrated the preferred form of my invention, the numeral 1 designates a water supply pipe to which is connected, by means of a packing nut 2, the inlet pipe 3 of the filter device. The said pipe 3 has a flared end 4 formed integrally therewith from which an annular flange 5 projects, the said flange fitting within a cap 6 threaded upon the lower extremity of a cylindrical receptacle or container 7, the latter forming the shell or body of the filter. The lower extremity of the cap 6 has formed integrally therewith an inwardly directed annular flange 8, the periphery of which engages the outer face of the flared portion 4, while the flange 5 of the said flared portion overlaps the said flange 8 of the cap for effecting a secure connection between the inlet pipe 3 and the body 7 of the filter. To prevent the escape of the liquid contained in the filter, I provide a rubber gasket 9 fitted upon the upper face of the flared portion 4 and upon which the extremity of the body 7 normally rests. The said inlet pipe 3 extends into the body 7 of the filter as at 8 so as to discharge the water thereinto at a point about midway the length of the body 7.

The upper end of the filter body 7 is threaded into a cap 10 and is connected to an outlet pipe 11 in the same manner as the inlet pipe 3 is connected, such connection comprising a flared portion 12, an annular flange 13 and gasket 14. The continuation of the outlet pipe 11 extends into the interior of the body 8 as at 15, the lower extremity of such extension 15 having a screen 16 fitted across the end thereof, the purpose of which will subsequently appear. A discharge pipe 17 is secured to the outlet pipe 11 of the filter by means of a packing nut 18, the said outlet pipe extending into the interior of the discharge pipe, as is clearly shown in the drawings.

An opening 19 is formed in the extension 8 of the inlet pipe 3 near the base of the said extension through which the water may drain from the catch basin as that portion of the receptacle 7 surrounding the extension 8 will be hereinafter termed, should occasion demand, thus preventing the freezing of the water normally contained within the said body.

Having described fully the construction of the filter, its operation will now be described in detail. The water upon entering the body 7 by means of the supply pipe 1, the inlet pipe 3 and extension 8 is discharged into the said body about midway the length thereof, the sand, grit or other solid impurities contained in the water being checked or prevented from entering the extension 15 of the outlet pipe 11 by means of the screen 16 secured over the mouth thereof. By extending the inlet pipe 3 into the interior of the body 7 by means of the extension 8, such impurities or foreign matter is free to settle in the catch basin of the said body where it is collected and distrained until subsequently purposely removed. By the provision of the extension 15, it will be seen that the water is free to pass from the body 7, free from all solid impurities, where it is discharged through the medium of the outlet pipe 11, discharge pipe 17 and the faucet or other appliance employed in connection with the invention.

An air chamber is formed within the upper extremity of the body 7 for the purpose of receiving and absorbing the shock or strain that would otherwise be imparted to the pipes and joints, attending the sudden cutting off of the water supply. By extending the projection 15 into the interior of the body 7 it will be seen that the water is normally retained upon a level approximately on the same plane as the extremity of the said extension thus forming the chamber between the upper extremity of the body and the water level, this construction allowing the air within the chamber to be compressed for receiving the strain and shock as above described.

It will be seen from the above, taken in connection with the accompanying drawings that the water upon leaving the filter is free from all solid substance, and that the same will in no way interfere with the working of the valves or other appliances through which it is finally discharged; that the sediment may be withdrawn or removed from the catch basin by disconnecting the body 7 from the cap 6; and that various forms of water tight connections may be employed in connection with a device of this character without in any way altering or affecting the utility of the device.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to when required, without sacrificing any of the advantages of my invention, as defined in the appended claims.

Having thus fully described my invention, what I claim as new and desire to secure by Letters Patent, is:—

1. In a filter, a tubular vessel, an inlet pipe connected through the lower end of said tubular vessel in a water-tight seal and extended to have the inner end thereof terminate at a point adjacent the center of said vessel, an outlet pipe sealed through the upper end of said vessel to extend into proximity to the inlet pipe to be spaced directly thereabove and beveled at the lower end to form an opening substantially elliptical when viewed in side elevation, and a strainer medium through which the water passes in the travel through the outlet.

2. In a filter, a vessel comprising a substantially tubular body, an inlet pipe extended through the bottom opening of said vessel to be sealed therein in a water-tight relation and to have the inner end at a point proximate to the center of said vessel, an outlet pipe extended through the upper end of said tubular vessel to have the intake end positioned directly above and cut at an angle to the vertical axis thereof, a screen arranged over said angularly cut end of the outlet pipe in a manner to strain the water passing therethrough and to discharge the impurities back into the vessel around the inwardly extended portion of said inlet pipe, and all of said parts so arranged that as water is permitted to flow through the inlet pipe, the air is driven from the vessel to a point that the water level is established at the highest open space of the angularly cut end of the outlet pipe and the remaining air is maintained as an air cushion.

In testimony whereof I affix my signature in presence of two witnesses.

EDWARD A. GEHRKE.

Witnesses:
OLLIE REITTER,
R. A. HARVEY.